United States Patent Office 3,180,905
Patented Apr. 27, 1965

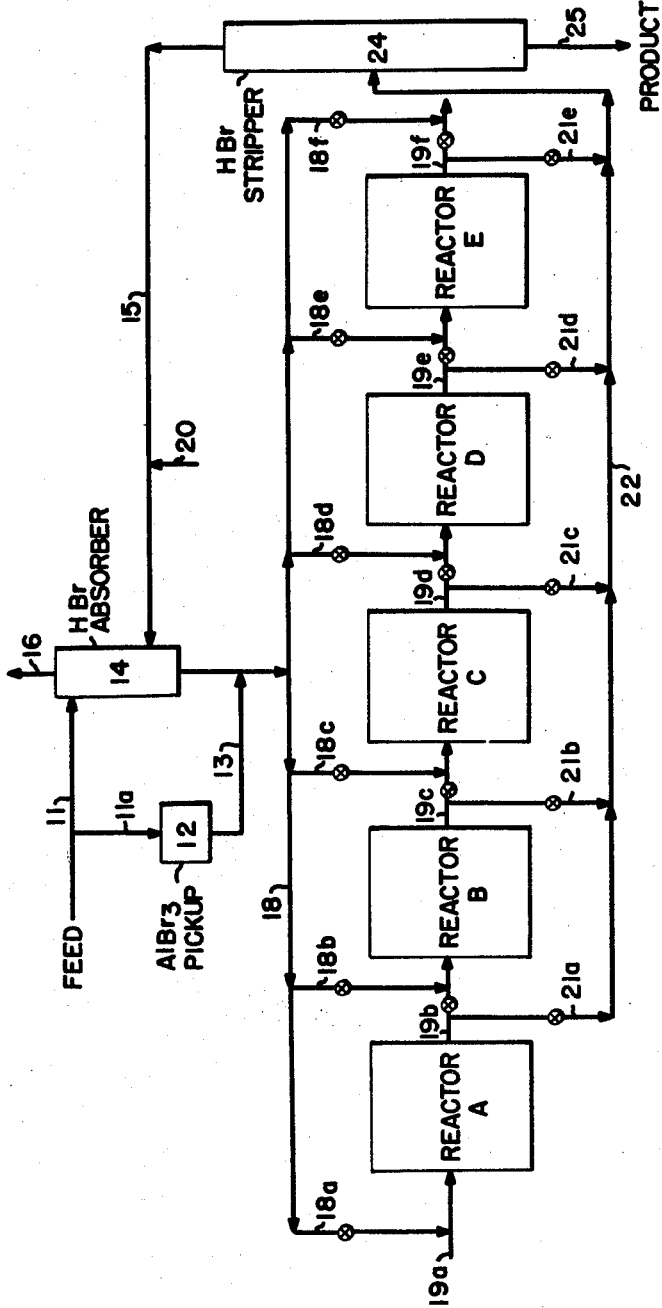

3,180,905
SUPPORTED AlBr₃ CATALYST OF ENHANCED ACTIVITY
Michael Francis McDonald, Sr., George Washington Adams, and Gordon Byron Jolley, all of Baton Rouge, La., assignors to Esso Research and Engineering Company, a corporation of Delaware
Filed Aug. 31, 1960, Ser. No. 53,195
8 Claims. (Cl. 260—683.7)

This invention relates generally to the isomerization of paraffin hydrocarbons in the presence of saturated aluminum bromide catalyst. The invention is particularly concerned with the preparation and use of supported aluminum bromide catalyst having unusually high activity for the promotion of paraffin hydrocarbon isomerization.

The conversion of straight chain or of slightly branched chain paraffin hydrocarbons to the more highly branched chain isomers is of considerable value to the petroleum refiner because it offers a convenient and economic means for obtaining higher octane rating constituents for automotive and aviation fuels. Aluminum bromide has been found to be particularly desirable as a catalyst for this type of reaction because of its activity at relatively low temperatures, i.e., of the order of 40° to 150° F. This temperature range favors the production of those branched chain isomers, particularly of the 5–6 carbon atom paraffin hydrocarbons, that have the highest antiknock ratings. Hence, any catalyst that exhibits high activity in the 40° to 150° F. temperature range is a valuable one.

It is one object of the present invention to provide an isomerization catalyst that possesses unusual activity for the isomerization of light naphthas and particularly of paraffin hydrocarbons of from 4–7 carbon atoms.

In accordance with this invention, the above object is attained by flowing a stream of hydrocarbons containing dissolved aluminum bromide through a bed of support at a temperature in the range of from 60–80° F. until at least 10 weight percent of aluminum bromide has been adsorbed on the support and then subsequently using the supported catalyst to promote a paraffin hydrocarbon isomerization reaction at a higher temperature of the order of 100–150° F. Not only does this method of catalyst preparation result in a more active catalyst, but it also reduces the cost of the catalyst inventory in an isomerization process. Contrary to the usual predictions based on observation of adsorption phenomena, the reduced temperature lowers the amount of aluminum bromide that is adsorbed on the support without reducing activity and, in fact, while increasing activity as compared with a catalyst prepared by adsorbing aluminum bromide at higher temperatures. Moreover, the catalysts formed at the lower temperatures are stable when raised to the higher temperature range of 100–150° F., and they do not desorb aluminum bromide nor do they adsorb additional quantities of aluminum bromide when used at the higher temperature.

The present invention is particularly applicable to paraffin hydrocarbon isomerization processes using what is known as a swing reactor system. In such a system a reactor train is employed comprising at least three reaction zones through which the stream of hydrocarbons to be isomerized is passed in series. All of the reaction zones except the final one in the train initially contain aluminum bromide adsorbed on a suitable support, such as silica, alumina, calcined bauxite, or the like, while the last zone in the train initially contains the support substantially devoid of aluminum halide. Suitable conditions for paraffin hydrocarbon isomerization are maintained in at least one of the zones except the final one. Isomerization then takes place in the zones containing aluminum bromide and as the hydrocarbon passes through those zones it carries with it a small quantity of dissolved aluminum bromide. This dissolved aluminum bromide is removed from the hydrocarbon stream by adsorption on the catalyst support in the final zone of the series. As the process proceeds, the final zone undergoes a gradual buildup in aluminum bromide until a point is reached where the support will no longer adsorb additional aluminum bromide. At this point, an additional reaction zone, which initially contains catalyst support substantially devoid of aluminum bromide, is placed in the last position in the train, and one of the reaction zones in the front end of the train is removed. Usually the latter will be the first zone in the train.

In practicing the present invention with a swing reactor system, the reaction zone that is last in the train, i.e., the zone in which aluminum bromide is being adsorbed, is maintained at a lower temperature than the other zones, i.e., the zones in which the hydrocarbons are undergoing isomerization.

The nature of this invention, particularly as it is applied to a swing reactor isomerization system, will be more readily understood when reference is made to the accompanying drawing in which the single figure is a schematic flow plan depicting one embodiment of the process.

Referring now to the drawing, the feed stream for the process is obtained from a suitable source by means of line 11. This feed stream may, for example, comprise a light naphtha feed or a refinery hexane cut, and may initially contain materials that might tend to poison the catalyst. Such materials include olefins, aromatic hydrocarbons, and sulfur compounds. It is usually desirable that the feed first be treated to remove such deleterious materials before subjecting the hydrocarbons to isomerization. Feed pretreatment may include one or more of such steps as solvent extraction, extractive distillation, hydrogenation, or treatment with selective adsorbents, such as, silica gel or molecular sieve zeolites.

The treated feed entering through line 11 desirably contains dissolved therein small proportions of aluminum bromide, of the order of about 0.05 to about 0.5 percent, and preferably of the order of about 0.1 to about 0.3 percent by weight. To supply the dissolved aluminum bromide, a small portion of the feed stream is diverted by means of line 11a through an aluminum bromide pickup zone 12 containing aluminum bromide in a suitable state of solution in the diverted stream. The aluminum bromide in zone 13 may be in previously prepared form or it may be available as AlBr₃ prepared in situ from aluminum and HBr, for example. The balance of the feed stream is conducted to a recycle gas absorber and vent gas scrubber 14 where it is saturated with hydrogen bromide, recycled to the process via line 15. Unwanted gases are vented from absorber 14 via line 16. The effluent from absorber 14 and the effluent from pickup zone 12 are combined in line 17 and sent to feed distribution line 18.

As illustrated in the figure, the reaction system includes at least five zones labeled A, B, C, D, and E. At least three of these zones will be in use at any one time. Preferably, at least three of the zones will be used for the isomerization reaction, and the fourth zone for the adsorption of aluminum bromide, while the fifth zone is being reconditioned for use in the reaction train.

At the start of the process, zones A, B, and C, for example, may be charged with a suitable support, for example calcined bauxite saturated with aluminum bromide, while zone D will contain the support with no aluminum bromide. The valves in the various lines may then be set so that the hydrocarbon feed will flow from line 18 through line 18a into zone A and then in succession through zones B, C, and D by means of lines 19b, 19c, and 19d. The valves in the various lines 21 will be set so that the effluent will leave only through line 21d.

In this stage of the process, zones A, B, and C will be maintained at a reaction temperature in the range of from 100–150° F. and preferably from about 115–125° F. Zone D will be maintained at a lower temperature of from 60 to 80° F. and preferably about 70° F. After the catalyst support in zone D has become saturated with aluminum bromide, the effluent in line 19e will be directed into zone E, which has now been suitably prepared by charging it with a quantity of catalyst support devoid of aluminum bromide. One of the zones A, B, or C, preferably zone A, is cut out of the train, and the feed is then directed by means of the proper feed line, e.g., line 18b into the new lead reactor of the train. Zone D is then raised in temperature to that of the other reaction zones in the train, while zone E is maintained at the desired adsorption temperature of 60–80° F.

The effluent from the reactor train in one of the lines 21 is sent via effluent collection line 22 to a suitable separation zone such as HBr stripper 24 where the hydrogen bromide is removed from the product and recycled by means of line 15 to the hydrogen bromide adsorption zone 14. Make-up HBr and/or HBr needed for start-up can be supplied to the system by means of line 20. The isomerized naphtha free of halides is then sent via line 25 to further treating steps or to a gasoline blending step.

To simplify the drawing, lines providing for by-passing any of the zones in the series, as well as a line connecting line 19f with line 19a, to place zone A next in line to zone E, are not shown.

Instead of initially charging zones A, B, and C with previously saturated support, the support initially devoid of aluminum bromide may be placed in the zones and then saturated in situ in the temperature range of 60–80° F. by running in feed hydrocarbons containing dissolved aluminum bromide.

The following example illustrates the operation of the process of this invention and the advantages obtained by conducting the adsorption step at a lower temperature than the isomerization reaction temperature. In this example the feed consisted of a South Louisiana virgin $C_5/C_6$ naphtha that was hydrogenated over a nickel-on-kieselguhr catalyst. The hydrogenated feed contained less than 0.001% benzene, less than 0.001% olefins and less than 0.001% sulfur.

EXAMPLE

Four reaction zones charged with calcined bauxite (Porocel) containing aluminum bromide adsorbed thereon were connected in a train and the hydrocarbon feed was run through the zones in series. Reaction conditions included temperatures of 125° F. in the first three reaction zones, 0.4 v./v./hr. space velocity, 0.3 weight percent $AlBr_3$ dissolved in the feed and 10 weight percent HBr based on feed. Conversions were 90% iso $C_6$ on total $C_6$ paraffins and 75% iso $C_5$ on total $C_5$ paraffins. The effluent from this train of reaction zones was passed through an additional zone maintained at, in some cases, the same temperature as the reaction zones and in other cases at lower temperatures. After the support in the additional reaction zones had become saturated with aluminum bromide, that zone was employed in the reaction train at the same reaction conditions as the other zones. Subsequently the isomerization activity of the catalyst in that zone was determined. Relative activities were also measured at the adsorption temperatures. The results obtained with different temperatures of aluminum bromide adsorption are shown in Table I. The relative activity values in each instance are averages obtained during periods of 7 days operation.

Relative catalyst activity was determined from the ratios of reversible reaction rate constants calculated from the equation shown below. This equation has a sound theoretical basis and has also been found to fit a vast amount of data, both batch and flow tests.

$$k = \frac{K}{K+1} \text{v./v./hr.} \ln\left[\frac{(K+1)C_F - 100}{(K+1)C_P - 100}\right]$$

where

K (equilibrium constant) =
$$\frac{\text{equilibrium isomer concentration}}{100 - \text{equilibrium isomer concentration}}$$

$C_F$ = concentration of normal paraffins relative to total paraffins in feed, and $C_P$ = concentration of normal paraffins relative to total paraffins in the product.

For $C_6$ paraffins at 125° F. $K = 18$.

Table I

| Reactor | Saturation Temperature, °F. | Wt. percent $AlBr_3$ in Hydrocarbon | Wt. percent $AlBr_3$ Adsorbed on Support | Relative Activity at 125° F. | Relative Activity at Saturation Temperature |
|---|---|---|---|---|---|
| 1 | 125 | 0.15 | 26.0 | 100 | 100 |
| 2 | 125 | 0.17 | 28.5 | 94 | 94 |
| 3 | 70 | 0.18 | 11.6 | 177 | 106 |
| 4 | 30 | 0.24 | 17.8 | 168 | 2 |
| 5 | 125 | 0.34 | 71.0 | 100 | 100 |
| 6 | 70 | 0.31 | 32.5 | 191 | 95 |

It will be noted that when adsorption was conducted at a temperature lower than reaction temperature, the resulting catalyst activity was much greater than when the catalyst had been formed at the isomerization temperature of 125° F.

In the case of reactors 1 to 4 inclusive the feed consisted of a blend of equal volumes of isobutane and the $C_5/C_6$ naphtha, while in the case of reactors 5 and 6 the feed was the $C_5/C_6$ naphtha without added isobutane. Therefore the catalyst activities of reactors 1 to 4 are to be compared with each other, and the activities of reactors 5 and 6 are to be separately compared with each other.

The percentages of $AlBr_3$ adsorbed on the support as reported in Table I were determined by direct analysis of the discharged catalyst after the reactor was removed from the reactor train.

The adsorption figures point up the fact that after the support becomes saturated with $AlBr_3$ at 70° F. the support does not adsorb more $AlBr_3$ when the temperature is raised to 100–125° F. and more feed containing $AlBr_3$ is brought into contact with it. This is an important observation because is demonstrates the value of the present invention, enabling $AlBr_3$ costs to be cut in half in a commercial isomerization unit.

The adsorption temperature of 60–80° F. is considered critical for three reasons:

(1) $AlBr_3$ requirements for catalyst formation are at a minimum. Consequently these conditions produce the least expensive catalyst.

(2) Catalyst activity while forming the catalyst at 60–80° F. is equivalent to catalyst formed at 125° F. Catalyst activity while forming the catalyst at 30° F. is virtually nil. This means that if the catalyst is formed at 30° F. the overall catalyst inventory would be some 25% greater for a 4-reactor system than the preferred operation conditions of 60–80° F.

(3) Refrigeration costs increase sharply at temperatures below 60° F. Consequently costs for 30° F. operation would be prohibitive for temperate climates.

The scope of the invention is not to be limited by the specific examples presented but only by the appended claims.

What is claimed is:

1. In the isomerization of paraffin hydrocarbons in the presence of aluminum bromide adsorbed on a support, the improvement which comprises flowing a stream of hydrocarbons containing aluminum bromide dissolved therein through a bed of the said support initially substantially devoid of aluminum bromide, at a temperature in the range of from about 60° to about 80° F. until at least 10 weight percent of AlBr$_3$ has been adsorbed on the support and thereafter employing the resulting supported catalyst for the isomerization of paraffin hydrocarbons by contacting the said paraffin hydrocarbons with the said catalyst at temperatures of from 100° to 150° F. and at pressures sufficient to maintain said hydrocarbons in the liquid state.

2. In the isomerization of paraffin hydrocarbons of from about 4 to 7 carbon atoms in the presence of aluminum bromide on a support, the improvement which comprises flowing said hydrocarbons, containing from about 0.05 to about 0.5 wt. percent of aluminum bromide through at least three reaction zones in series, all of said zones except the last one intially containing aluminum bromide on a support, the last zone of the series initially containing said support substantially devoid of aluminum bromide, maintaining an isomerization temperature of from about 100 to 150° F. in at least one of said zones other than said last zone, maintaining a temperature of from 60 to 80° F. in said last zone, continuing hydrocarbon flow through said series of zones until to, such support contains at least 10 wt. percent of aluminum bromide thereafter discontinuing hydrocarbon flow through a selected one of said zones other than said last zone, increasing the temperature in said last zone to a temperature in the range of 100° to 150° F., and conducting hydrocarbon flow through all of said zones except said selected zone, and then through an additional zone in series, said additional zone initially containing said support substantially devoid of aluminum bromide and initially being maintained at from 60 to 80° F.

3. In the isomerization of paraffin hydrocarbons in the presence of aluminum bromide adsorbed on a support, the improvement which comprises flowing a stream of hydrocarbons containing aluminum bromide dissolved therein through a bed of said support, wherein the first catalyst adsorbent bed contacted with said aluminum bromide containing hydrocarbon is a bed initially substantially devoid of aluminum bromide, carrying out the contacting at a temperature in the range of from about 60–80° F. until a catalytic amount of aluminum bromide has been absorbed on the support and thereafter employing the resulting supported catalyst for the isomerization of paraffin hydrocarbons.

4. The process of making an improved adsorbed catalyst on a support which comprises contacting a stream of hydrocarbons containing aluminum bromide dissolved therein with a bed of said support wherein the hydrocarbon stream is contacted with a bed of said support initially devoid of aluminum bromide at a temperature in the range of about 60–80° F.

5. In the isomerization of paraffin hydrocarbons in the presence of aluminum bromide on a support, the improvement which comprises flowing said hydrocarbons through at least three reaction zones in series, all of said zones except the last one initially containing aluminum bromide, said last zone being initially devoid of aluminum bromide, maintaining an isomerization temperature of from about 100 to 150° F. in at least one of said zones other than said last zone, maintaining a temperature of from 60 to 80° F. in said last zone, continuing hydrocarbon flow through said series of zones until sufficient aluminum bromide has been adsorbed from the hydrocarbon stream by the support in said last zone to catalyze isomerization in said last zone, said hydrocarbon stream fed to said last zone containing substantially all of the dissolved aluminum bromide present in the effluent from the isomerization reactor, thereafter discontinuing hydrocarbon flow through a selected one of said zones other than said last zone, increasing the temperature in said last zone to a temperature in the range of 100 to 150° F., and conducting hydrocarbon flow through all of said zones except said selected zone, and then through an additional zone in series, said additional zone initially containing said support substantially devoid of aluminum bromide and being maintained at from 60 to 80° F.

6. In the isomerization of paraffin hydrocarbons in the presence of aluminum bromide on a support, the improvement which comprises flowing said hydrocarbons through at least three reaction zones in series, all of said zones except the last one initially containing aluminum bromide, said last zone being initially devoid of aluminum bromide, maintaining an isomerization temperature of from about 100 to 150° F. in a least one of said zones other than said last zone, maintaining a temperature of from 60 to 80° F. in said last zone, continuing hydrocarbon flow through said series of zones until sufficient aluminum bromide has been adsorbed from the hydrocarbon stream by the support in said last zone to catalyze isomerization in said last zone, said hydrocarbon stream fed to said last zone containing substantially all of said isomerized product from the isomerization reactor, thereafter discontinuing hydrocarbon flow through a selected one of said zones other than said last zone, increasing the temperature in said last zone to a temperature in the range of 100 to 150° F., and conducting hydrocarbon flow through all of said zones except said selected zone, and then through an additional zone in series, said additional zone initially containing said support substantially devoid of aluminum bromide and being maintained at from 60 to 80° F.

7. The process of claim 5 wherein the hydrocarbon effluent from the isomerization reactor containing the dissolved aluminum bromide fed to said last zone, initially substantially devoid of aluminum bromide, contains substantially all of the isomerized product.

8. In the isomerization of a light naphtha hydrocarbon stream in the presence of aluminum bromide on a support and in the presence of aluminum bromide dissolved in said hydrocarbons wherein the isomerization reaction is carried out in the liquid phase, the improvement which comprises continuously flowing said hydrocarbons in the same direction of flow through a train of at least three reaction zones in series, all of said zones except the last one initially containing said aluminum bromide on said support, the last reaction zone of the series initially containing said support substantially devoid of aluminum bromide, maintaining hydrocarbon isomerization conditions in at least all of said reaction zones except said last zone, continuing hydrocarbon flow through said series of zones wherein the entire hydrocarbon effluent from the preceding zones is fed to the last zone in series until sufficient aluminum bromide has been adsorbed from said hydrocarbon stream by the support in said last zone to catalyze isomerization in said last zone, the temperature in said last zone at which said aluminum bromide is adsorbed on said support being between 60 and 80° F., thereafter discontinuing hydrocarbon flow through a selected zone other than said last zone, removing said selected zone from said train, and conducting hydrocarbon flow of the entire hydrocarbon effluent from the preceding zones through the remaining zones, and through an additional zone in series, said additional zone initially containing said support initially substantially devoid of aluminum bromide.

References Cited by the Examiner
UNITED STATES PATENTS

| | | | |
|---|---|---|---|
| 2,324,746 | 7/23 | Weinrich et al. | 260—683.67 |
| 2,938,062 | 5/60 | Perry | 260—683.75 |
| 2,946,833 | 7/60 | Kimberlin et al. | 260—683.74 |
| 2,992,285 | 7/61 | Arey et al. | 260—683.75 |
| 2,998,467 | 8/61 | Gilbert | 260—683.75 |
| 3,005,035 | 10/61 | Kimberlin et al. | 260—683.75 |
| 3,077,504 | 2/63 | McDonald et al. | 260—683.67 |

ALPHONSO D. SULLIVAN, Primary Examiner.